United States Patent [19]

Melchior et al.

[11] 4,114,379
[45] Sep. 19, 1978

[54] POWER UNIT

[75] Inventors: Jean Melchior; Thierry André, both of Paris, France

[73] Assignee: Etat Francais, Paris, France

[21] Appl. No.: 611,010

[22] Filed: Sep. 8, 1975

[30] Foreign Application Priority Data

Sep. 10, 1974 [FR] France .................. 74 30519

[51] Int. Cl.² .................................. F02B 33/44
[52] U.S. Cl. .............................. 60/606; 60/599;
60/614; 60/601; 60/619
[58] Field of Search ........... 60/599, 606, 614, 615,
60/617, 619, 600, 601, 603

[56] References Cited

U.S. PATENT DOCUMENTS

| 2,585,029 | 2/1952 | Nettel | 60/606 |
|---|---|---|---|
| 2,608,051 | 8/1952 | Nettel | 60/601 |
| 2,620,621 | 12/1952 | Nettel | 60/601 |
| 3,676,999 | 7/1972 | Oldfield | 60/606 |
| 3,949,555 | 4/1976 | Melchior | 60/619 |

FOREIGN PATENT DOCUMENTS

1,040,839 10/1958 Fed. Rep. of Germany ............. 60/614

Primary Examiner—Ronald H. Lazarus
Attorney, Agent, or Firm—Barnes, Kisselle, Raisch & Choate

[57] ABSTRACT

A supercharged engine is provided with a by-pass pipe through which all the air from the compressor which is not absorbed by the engine flows towards the turbine through an auxiliary combustion chamber. There is provided a system for supplying fuel to the combustion chamber, comprising means for regulating the flow rate of fuel supplied to the auxiliary chamber so as to prevent the supercharging pressure falling below a set value; in which power unit the regulating means comprise sensing means sensitive to the quantity of fuel injected per cycle into the engine so that each value of the said quantity of fuel is made to correspond to a particular set value of supercharging pressure.

20 Claims, 6 Drawing Figures

POWER UNIT

BACKGROUND OF THE INVENTION

This invention relates to a power unit comprising an internal combustion engine supercharged by a turbinecompressor unit having at least one compressor and at least one turbine driving the compressor, a by-pass pipe enabling air supplied by the compressor and not absorbed by the engine to flow towards the turbine, and an auxiliary combustion chamber disposed upstream of the turbine receiving the air flowing in the by-pass pipe.

Power units of this kind are described in U.S. Pat. No. 3,988,894 assigned to the assignee of the present invention.

In simple cases, the engine by-pass pipe can be wide open. In other embodiments described in U.S. Pat. No. 3,988,894, the by-pass is provided with throttle means having a continuously variable flow cross-section and controlled substantially by the pressures upstream and downstream of the throttle means, an increase in the pressure downstream of the throttle means tending to reduce the flow cross-section of the throttle means, and an increase in the pressure upstream of the throttle means tending to increase the flow cross-section, so that the pressure difference produced by the throttle means varies directly with the pressure in the by-pass pipe upstream of the throttle means, typically in a substantially linear manner.

The invention is applicable mainly though not exclusively to diesel engines (i.e. engines in which the fuel injected into each cylinder is ignited simply by the temperature and pressure of the air in the cylinder at the moment of injection) and applies still more particularly though not exclusively to diesel engines having a high supercharging ratio (which may exceed 5) and a relatively low compression ratio (which may be less than 8). Very highly supercharged diesel engines of this kind are adapted to burn four or five times as much fuel per cycle as a similar engine which is not supercharged. The engine injection pump should be suitably dimensioned. However, in order not to increase excessively the gas temperature (inter alia the temperature of the exhaust gases), which would result in the rapid destruction of engine components, the engine must be provided not only with the air required for burning the injected fuel but also with an excess of air (up to 150% of the preceding amount) so as to maintain the temperature of the gases in the engine cylinders at an acceptable value. In other words, the richness (the ratio of the mass of the injected fuel to the mass of the air introduced into the engine) must be prevented from exceeding a limiting value.

It has already been proposed, e.g. in Zuhn U.S. Pat. No. 3,096,615, to protect a supercharged engine by limiting the rate of fuel injected per cycle in dependence on the quantity of air supplied by the compressor, i.e. substantially in dependence on the supercharging pressure. To this end, the fuel supply system is provided with flow-limiting means which usually, in the case of a mechanical supply pump, comprise means for regulating the position of the pump rack stop and sensitive to the supercharging pressure.

An arrangement of this kind, which can be called "passive" since it has only a limiting effect, actually protects the engine by preventing the fuel injection rate from rising above a value which is not dangerous for the engine, allowing for the inlet pressure, which cannot be controlled in the case of a conventional supercharged engine (in which the exhaust gases are not reheated before being introduced into the turbine). In the case of a power unit provided with an auxiliary fuel chamber of the kind described in the aforementioned U.S. Patent Specification, this problem can be solved only if the substantially constant value at which the supercharging pressure is maintained is set at a level corresponding to the most unfavourable engine operating conditions, i.e. too high for most operating conditions, resulting in the disadvantage of excessive fuel consumption in the auxiliary combustion chamber.

Furthermore, the limitation is a serious disadvantage for any supercharged engine which does not have a permanently open by-pass pipe, since its acceleration capacity is very unfavourably affected since the increase in the flow rate of fuel injected into the motor and required during acceleration is delayed by the limiting means until the supercharging pressure has increased to a high value so as to withdraw the rack stop of the fuel injection pump. In other words, the engine is slow to respond to action tending to increase the load or the speed. This disadvantage increases in proportion to the supercharging ratio under full load; in practice it becomes unacceptable in engines which must respond very quickly to a large torque requirement and which have a supercharging ratio which is greater than conventional ratios, which do not exceed 4.

SUMMARY OF THE INVENTION

It is an object of the invention to provide a power unit in which the aforementioned short comings are substantially overcome.

Accordingly to another aspect of the invention, there is provided a power unit comprising: an internal combustion engine; a turbine-compressor unit for supercharging the engine and having at least one compressor and at least one turbine driving the compressor; a by-pass pipe through which all the air from the compressor which is not absorbed by the engine flows towards the turbine; an auxiliary combustion chamber disposed upstream of the turbine and receiving the air flowing in the by-pass pipe; and a system for supplying fuel to the auxiliary combustion chamber, comprising means for regulating the flow rate of fuel supplied by said system to the auxiliary chamber so as to prevent the supercharging pressure falling below a set value; in which power unit the regulating means comprise sensing means responsive to the quantity of fuel injected per cycle into the engine so that each value of the said quantity of fuel is made to correspond to a particular set value of supercharging pressure.

The mass ratio of air to fuel is permanently prevented from falling below the value at which the maximum temperature reached by the gases in the cylinder becomes unacceptable for the engine. Each engine has a limiting factor which is specific for that engine: it may be for instance, the temperature of the exhaust valves or of the cylinder head or of the piston. The maximum thermal load to be considered will be the load corresponding to the aforementioned factor.

The regulating means can have any suitable construction, either pneumatic or electric or electronic; in the case where the device supplying fuel to the auxiliary chamber is pneumatically controlled, it is usually advisable to use a pneumatic arrangement. In other cases, it may be advantageous to use electronic means for regulating the flow rate of fuel supplied to the auxiliary combustion chamber.

In order that the invention may be readily understood, embodiments thereof will now be described, by way of example, with reference to the accompanying drawings, in which:

DETAILED DESCRIPTION

The invention will now be described, by way of example, as applied to a power unit comprising: an internal combustion engine which is ignited by compression and has a relatively low compression ratio (less than 8); a turbine-compressor unit for supercharging the engine at a high level compared with conventional values; and a by-pass pipe provided with an auxiliary combustion chamber and through which all the compressor flow not absorbed by the engine travels towards the turbine. A power unit of this kind is diagrammatically shown in FIG. 2 and comprises: an internal combustion engine 10 provided with an inlet manifold 11 and an exhaust manifold 12; a turbine-compressor unit comprising an air compressor 13 and a turbine 14; and a by-pass pipe 15 in which an auxiliary combustion chamber 16 is disposed. A cam-actuated mechanical pump 17 driven by the engine injects a mass of fuel into each cylinder during each engine cycle, the mass depending on the position of rack 18. We shall assume hereinafter the movement of the rack towards the right corresponds to an increase in the mass of the injected fuel. The power unit also comprises, in the by-pass pipe 15, throttle means 19 which automatically maintain the pressure drop at a value which is independent of the flow into duct 15 and which increase (typically in substantially linear manner) with the supercharging pressure.

Figure 1:
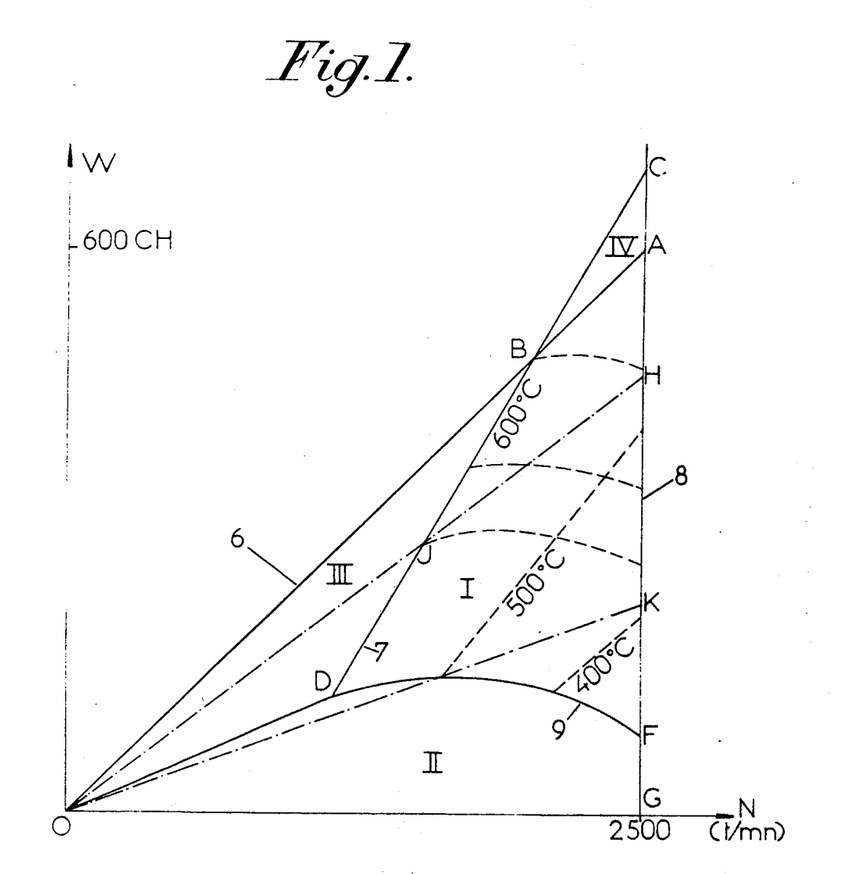
FIG. 1 is a diagram illustrating the operating conditions of a power unit according to the invention, having a supercharged internal combustion engine ignited by compression.

The operating diagram of a power unit of this kind is shown in FIG. 1, where the power W at the motor shaft is plotted along the ordinate and the rotary speed of the engine 10 is plotted along the abscissa. Consequently, the curves for operation at constant speed (i.e. for a given adjustment of the regulator in the case of a conventional diesel engine) are straight lines parallel to the ordinate axis; constant-torque operation curves are straight lines extending from the origin.

The possible range of operation of a diesel engine is limited firstly by mechanical or thermal factors and secondly by the conditions for operation, i.e. ignition by compression. The corresponding limits are shown in FIG. 1 by continuous curves separating various operating ranges in the case of the invention.

The maximum torque which the engine can provide is limited by the maximum pressure permitted in the cylinders. If it is assumed that the torque is independent of the speed (this is correct as a first approximation) the corresponding limit is represented by a straight line 6 passing through the origin. As we shall see, however, if the efficiency of the turbine-compressor unit is sufficiently high, it can discharge some of the exhaust gases to atmosphere (the range denoted by IV hereinafter) and the torque can be further increased while remaining within acceptable pressure limits.

At the critical place in the engine (the temperature of the exhaust or of the cylinder head or the piston) the thermal load should not reach a value resulting in rapid destruction. The corresponding limit is represented by a substantially straight line 7 representing an exhaust temperature of 600° C., which can be regarded as representative of conventional engines.

The engine speed is limited; if we assume that the limiting speed is independent of the torque, it can be represented by a line 8 parallel to the ordinate axis, e.g. for 2500 r.p.m.

The engine is able to operate, i.e. self-ignition should occur, when the auxiliary combustion chamber is inoperative. This condition corresponds to the limiting curve 9.

By way of example, FIG. 1 also shows dashed curves corresponding to various exhaust temperatures (400° C. and 500° C.) and various supercharging pressures.

Curve 8 represents an absolute operating limit. The region ABDF or I bounded by curves 6, 7, 8 and 9 corresponds to operation without an appreciable effect of the combustion chamber, the latter being inoperative or idling. In region ODFG or II, reheating means (the combustion chamber) prevent the supercharging pressure Ps from falling below a set value, i.e. the reheating increases the rate of fuel supply to chamber 16 if the power of engine 10 decreases. In order to operate in region ABC or IV, some of the gas travelling towards the turbine must be discharged to atmosphere so as to limit the supercharging pressure to a level such that the maximum combustion pressure in the cylinders remains acceptable.

Finally, in the region OBD or III, operation is possible only by applying the invention since, in this region, the exhaust temperature must be prevented from exceeding the maximum permissible value by raising the set value so that the richness limit is maintained in the cylinders. The set value should be such that the supercharging pressure (i.e. the flow rate of air absorbed by the internal combustion engine) is at a sufficient level to reduce the exhaust temperature to an acceptable value corresponding to line DB in FIG. 1.

If, now, we assume that operation at constant torque corresponds to a constant quantity of fuel injected per cycle (this is correct only as a first approximation since the engine speed also has an influence), operation at constant torque as represented in FIG. 1 by the chain-dotted line OH corresponds to a constant quantity of fuel injected per cycle into the engine. If, at constant torque, the engine speed decreases from the maximum speed corresponding to the point H, the compressor output pressure, which is then only, or almost only, due to the energy of the diesel exhaust gases, likewise decreases whereas the exhaust temperature increases, as shown by the position of line OH with respect to the constant exhaust temperature curves. This variation is due to the fact that the air/fuel ratio of the mixture in the cylinders decreases, the quantity of injected fuel remaining constant whereas the mass of inflowing air decreases with the supercharging pressure $P_s$. According to the invention, the auxiliary combustion chamber 19 (which has hitherto been inoperative or idle) acts as soon as the point J is reached corresponding to the maximum permissible exhaust temperature, so as to prevent the supercharging pressure from further decreasing and thus prevent the temperature from exceeding the thus-attained level.

In other words, the invention compensates for the progressive decrease in the energy supplied by the engine exhaust gases to the turbine by increasing (but just sufficiently, i.e. in the most economic manner) the heat supplied by the auxiliary combustion chamber 19.

Thus, the words "set value" denote the value at which regulating means act and maintain the supercharging pressure in the region III. Outside this region, inter alia in region 1 where the supercharging pressure is greater than the set value whereas the flow rate of fuel into the auxiliary combustion chamber is already at a minimum (since the chamber is inoperative or idle), the regulating means do not act.

If we assume that the amount of fuel injected per cycle represents the torque, we can see that control of the combustion chamber energization can easily be achieved at a suitable rate if the set value for the supercharging pressure is rendered responsive to the position of an element determining the quantity of fuel injected per cycle into the engine.

The means of the invention do not interfere with or disturb the actuation of the combustion chamber in the case where, when constant-torque operation corresponds to line OK, there is a transition from region I to region II. In that case, the auxiliary combustion chamber is controlled so as to maintain the supercharging pressure at a threshold or minimum value which, this time, is made such that ignition by compression effectively occurs, as explained in U.K. patent specification No. 1,291,030 dated Apr. 30, 1971 corresponding to U.S. Pat. No. 3,988,894.

Figure 3:
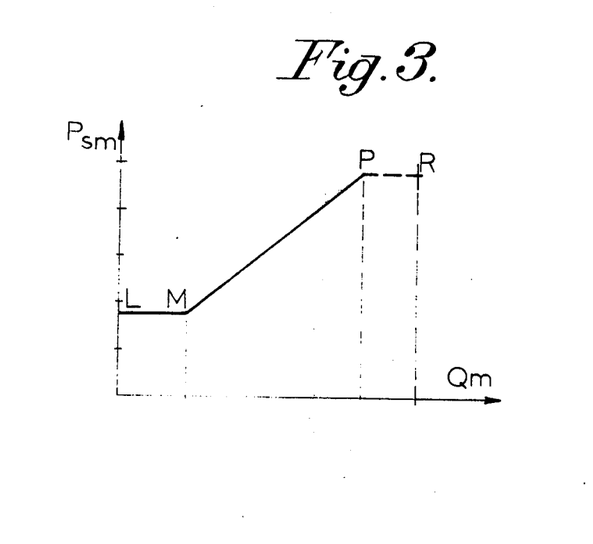
FIG. 3 is a curve showing a possible law of variation of the set pressure in dependence on the quantity of fuel injected per cycle into the engine.

In other words, the set value $P_{sm}$ of the supercharging pressure is varied in dependence on the mass $Q_m$ of fuel injected per cycle into the engine, as illustrated in FIG. 3. As can be seen, this curve comprises a number of clearly distinct portions. Portion LM corresponds to operation of the supercharged unit in region II of FIG. 1, where the combustion chamber is supplied so as to maintain the pressure $P_s$ at a fixed value which guarantees diesel operation of the internal combustion engine while the conditions are the most unfavourable.

Portion MP corresponds to operation in regions I and III. The minimum supercharging pressure (i.e. the set value) increases progressively in these regions, as an increasing function of $Q_m$. At a given value of $Q_m$, the operating point can be in the region between J and H in FIG. 1, in which case the engine exhaust gases can satisfy this condition. Alternatively, the operating point may be in region III (between O and J in FIG. 1) in which case the flow rate of fuel into the chamber increases above the idling rate so as to supplement the energy supplied by the engine, in proportion to the distance from region I.

Finally, portion PR corresponds to region IV in which the turbine-compressor efficiency is reduced since the super-charging pressure is kept below its normal value by venting to atmosphere. On the other hand, the engine operating region may thus be widened without using the auxiliary chamber.

FIGS. 2, 4, 5 and 6 show various embodiments of the invention as previously defined.

Figure 2:
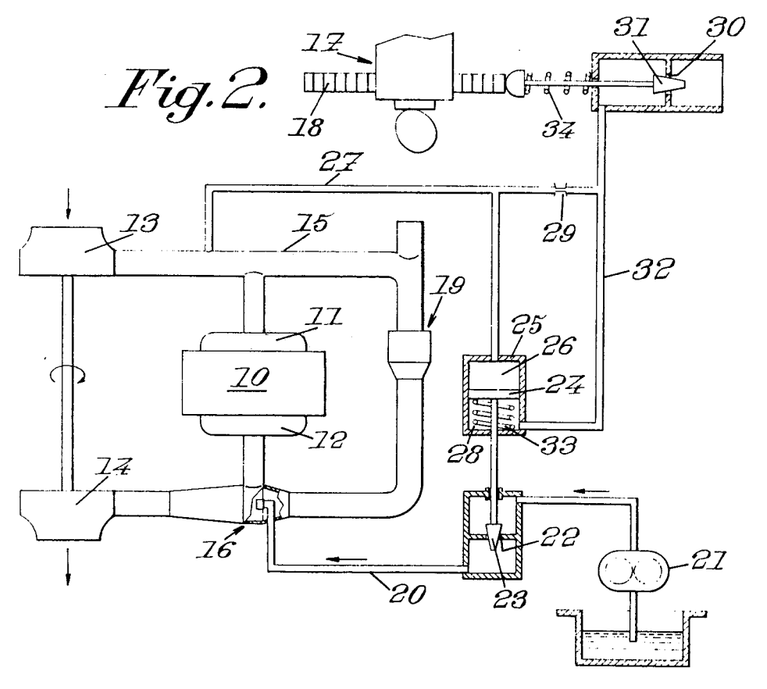
FIG. 2 is a block diagram of a power unit having a supercharged engine provided with a fuel supply device comprising a mechanical pump and a pneumatic system for maintaining a set value.

FIG. 2 is a diagram of a power unit comprising pneumatic regulating means, this embodiment having the advantage of being particularly simple and being easy to incorporate in a power unit comprising an internal combustion engine supplied by a mechanical pump which at each cycle supplies an amount which can be metered by the motion of a movable element (rack 18 in the present case) without great force being required for control. The regulating means comprise passage means having a flow cross-sectional area 22 which can be adjusted by moving a needle valve 23, in a duct 20 supplying chamber 16 with fuel under pressure from a pump 21. Needle valve 23 is connected to a piston 24 which slides in a cylinder 25 and separates two chambers therein. The first chamber 26 is subjected to the supercharging pressure supplied by a duct 27. The second chamber 28 is at a pressure depending on the position of rack 18, e.g. fixed by the ratio between the pressure drops produced by a restrictor 29 and a passage 30, the cross-sectioned area of which is adjusted by a needle valve 31 having a suitable shape and driven by the rack 18. Restrictor 29 and passage 30 are disposed in a leakage path to atmosphere from duct 27, and the pressure which prevails between them is communicated to chamber 28 by a duct 32. A return spring 33 is used to adjust the rate at which the supercharging flow rate varies in dependence on the position of the rack; inter alia the travel and the shape of needle valves 23 and 21 and the stiffness of spring 33 can be made such so as to obtain a law of variation of the kind shown in FIG. 3.

As can be seen, needle valve 31 acts as a pilote member on valve 23 and controls the flow rate provided to the auxiliary combustion chamber 16 without requiring any great force to actuate it. This feature, which is common to all pilot devices using a transducer supplying a variable pressure drop in dependence on the position of an element, is particularly important in the present case since racks cannot withstand large forces, at least in low or medium-power engines.

The operation of the device illustrated in FIG. 2 is clear from the preceding and need not be described in detail. It may, however, be useful to describe briefly the manner in which the means provided in accordance with the invention act during sudden acceleration. Suppose the motor is initially operating at a low load and a low speed. In this case, the speed governor actuated by the driver maintains a rack stop (not shown) in a position where the flow rate of fuel injected per cycle is far from the maximum. If the driver wishes to increase the speed, he moves the governor, which moves the rack stop in the direction increasing the flow rate (towards the right in FIG. 2). The rack then pushes needle valve 31 to the right, against the action of a return spring 34. The pressure increases in compartment 28 and needle valve 22 rises and increases the flow cross-section of the fuel into chamber 16, and also increases the flow rate. The turbine-compressor unit then speeds up very quickly and increases the supercharging pressure up to the value required for preventing overheating of the engine. In the case where a pneumatically actuated stop is provided (e.g. of the kind described in the article "Increased Rating of Diesels" in Journal of Science & Technology, volume 38, No. 3, Page 108, 1971), the stop can be driven back by the increase in the supercharging pressure. In proportion as the supercharging pressure increases, the differential pressure on piston 24 increases and tends to restrict the flow of fuel. When the set speed has been reached, the rack returns to a position corresponding to a new set value for the supercharging pressure, and the supply rate of the burner in chamber 16 automatically decreases until the supercharging pressure has returned to the set value. Since turbine-compressor units have low inertia, they increase speed very quickly, so that the engine operates at most for a few cycles during which the injected flow rate exceeds the rate compatible with the existing supercharging pressure. Furthermore, any unburnt fuel travels from the exhaust manifold 12 into the combustion chamber where it is burnt, thus further accelerating the increase in the speed of compressor 14. If, in some cases, the necessary supercharging pressure has to be provided before increasing the quantity of fuel injected per cycle into the engine, it is sufficient to actuate needle valve 31, not via the rack but via the rack-actuating means, and to locate a damper between the actuating means and the rack.

Figure 4:
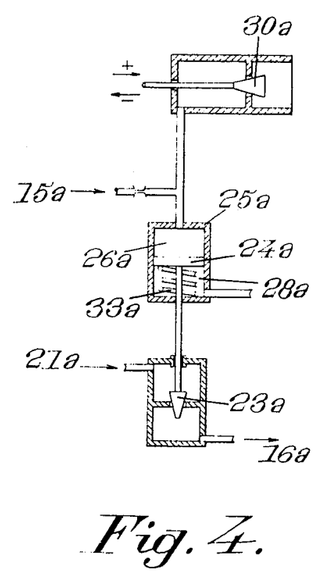
FIG. 4 is a detailed diagram showing a modified form of the servo system illustrated in FIG. 2.

Clearly, instead of using the system illustrated in FIG. 2, use could be made of the reverse system indicated in FIG. 4, where elements corresponding to those in FIG. 2 bear the same reference numbers plus the subscript a. In the embodiment in FIG. 4, the back-pressure is directly modulated, whereas the other surface of the piston is acted upon by the return spring 33a and by a low constant pressure (e.g. atmospheric pressure).

Pistons could be replaced by other movable or deformable means such as diaphragms. Additional adjusting means, in dependence on other parameters, could be added, e.g. in the form of orifices adjustable in parallel with passage 30 in the case of FIG. 2. For example, kinematic corrections could be made. Furthermore, the needle valves can be given a shape such that the portion MP of the curve in FIG. 3 is not rectilinear.

The engine shown in FIG. 2 comprises throttle means 40 which are disposed in pipe 15 and can be of the kind defined in the aforementioned U.S. Pat. No. 3,988,894 and are actuated by a system (not shown) mainly controlled by the pressures upstream and downstream, an increase in the pressure downstream of the constriction tending to reduce the flow cross-section thereof and an increase in the upstream pressure tending to increase the flow cross-section, so that the difference between the pressures produced varies directly with the pressure in pipe 15 upstream of the constriction. The constriction supplies a pressure drop which is independent of the flow through it, so that the pressure drop between the compressor and the turbine is independent of the engine speed (which determines the ratio between the compressor flow rate and, the flow rate through the by-pass pipe). The constriction can inter alia prevent the turbine-compressor unit from surging, by providing satisfactory adaptation at all times between the pressure and the flow rate. Thus, the risk of surge is eliminated even in the case where the operating conditions vary rapidly.

Figure 5:
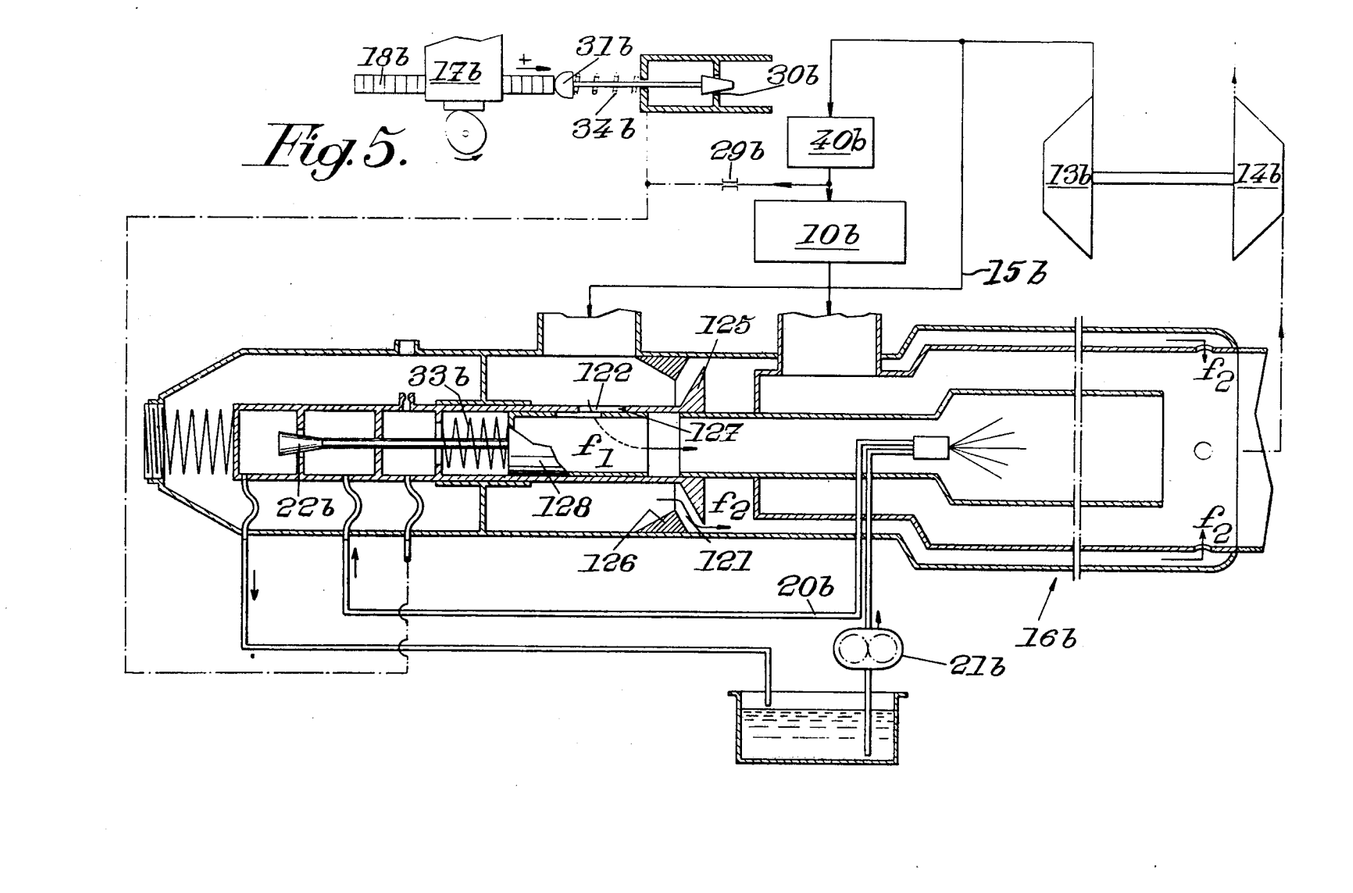
FIG. 5 is a diagram, more complete than FIG. 2, of a modified power unit comprising a device for automatically maintaining the pressure drop in the by-pass pipe at a value independent of the flow through the pipe.

In the alternative embodiment shown in FIG. 5, the throttle means having variable flow cross-sections are constructed as described and claimed in FIG. 2 of German Patent Specification P 23 16 027.2 and in U.S. Pat. No. 3,988,894. Since these means are completely described in the documents referred to we shall only mention here that they comprise throttle means 121, 125, 126 which are inserted in the secondary air flow for the auxiliary combustion chamber 16B, which is supplied with air via the by-pass pipe 15B and from which the primary air flow is separated from the secondary air flow upstream of the throttle means. The primary air flow rate, together with the flow rate of fuel supplied to chamber 16B, is regulated not by the supercharging pressure and a fixed back-pressure, but by the aforementioned regulating means.

More specifically, FIG. 5 shows elements corresponding to those in FIG. 1, but denoted by similar reference numbers plus a subscript b. Note, however, that the injector of chamber 16b is of the return flow type, i.e. the adjusting means act not on the flow rate sent to the injector via pipe 21b but on the flow rate returning to the fuel tank. Note also that the back-pressure is adjusted in dependence on the supercharging pressure sampled downstream of an air cooler 40b. In this manner, the elements comprising the adjusting means are not exposed to air at high temperature from compressor 13b. Since the pressure drop through the cooler 40b is very low (usually 1–2%) it does not in any way interfere with the control system.

Figure 6:
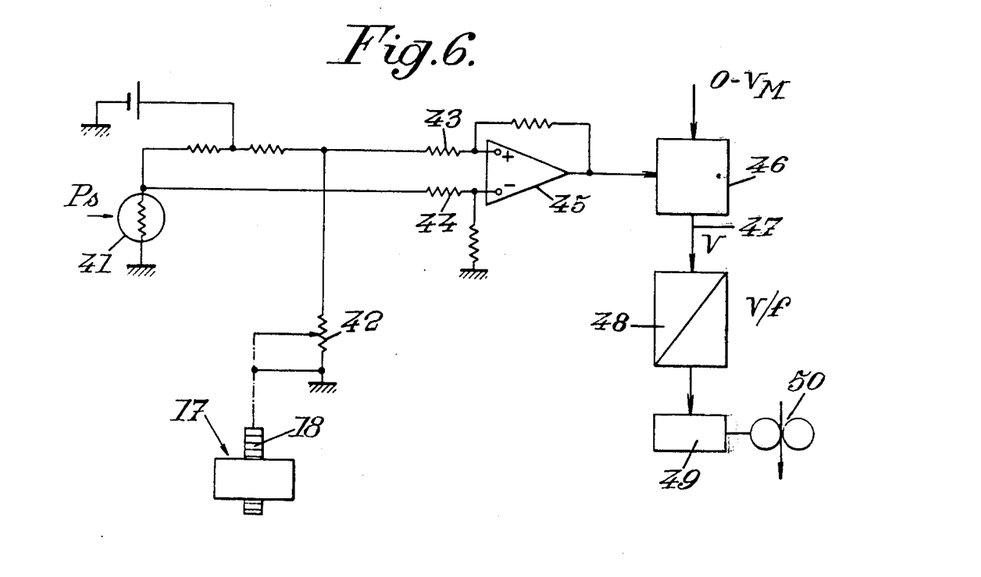
FIG. 6 is a block diagram of another embodiment comprising an electronic servo system.

The control means diagrammatically illustrated in FIG. 6, are electrical. Advantageously, for the sake of uniformity, this method is used when the device supplying fuel to the engine and/or auxiliary chamber is electronically controlled. Electrical adjusting means also make it easy to apply an additional correction parameter such as the engine speed, i.e. instead of just having a curve of the kind illustrated in FIG. 3, a curve is available which is offset or deformed in dependence on the engine speed.

The regulating means illustrated in very simplified form in FIG. 6 are for the case where the engine is supplied by a pump comprising a rack. The means comprise a detector network comprising a Wheatstone bridge, one arm of which contains a resistor 41 sensitive to the supercharging pressure Ps, and an adjacent arm containing a resistor 42 representing the set supercharging pressure. Assuming that the set value must be proportional to the mass of fuel injected per cycle by the pump, this is sufficient to actuate the sliding contact of resistor 42 by the pump rack, directly or via a cam.

The ends of the bridge diagonal are connected by resistors 43, 44 to the inputs of a differential amplifier 45 which therefore supplies an output voltage proportional to the bridge unbalance voltage, i.e. the difference between the set value (corresponding to the value of resistor 42) and the actual value of the supercharging pressure corresponding to the value of resistor 41, which can be a strain gauge.

The output of differential amplifier 45, which represents the error signal, is applied to a voltage generator 46 having sufficient power. Output 47 is supplied to a voltage-frequency converter 48 which supplies the motor 49 of a volumetric pump 50 with a constant electric current having a frequency N varying in some such manner as the following:

$$N = N_0 + a V.$$

(V being the voltage) at output 47.

Consequently, the volumetric pump supplies a flow delivery proportional to the frequency which varies between a minimum value corresponding to idling of the chamber (when the frequency is equal to $N_0$) and a maximum value corresponding to the most unfavourable conditons.

The operation of the device is clear; if the pump rack is in a position at which the supercharging pressure is insufficient, the error voltage supplied to generator 46 increases the output voltage thereof, i.e. increases the flow rate provided by pump 50 until the supercharging pressure reaches the set value and rebalances the bridge. Conversely, if the supercharging pressure becomes greater than the set value, the voltage generator receives an error signal having the opposite sign, until the output voltage returns to a value at which the pump flow rate is just sufficient for the supercharging pressure to equal the set value, except when the supercharging pressure is still above the set value after the auxiliary combustion chamber has returned to idling.

It can be seen that, whatever embodiment is adopted, its construction and function are very different from prior art systems for protecting supercharged diesel engines and comprising an auxiliary combustion chamber. The essential component is not a stop (this term is used in a general sense) limiting the mass of fuel supplied to the engine per cycle, in dependence on the available supercharging pressure. On the contrary, it may be regarded as a system for producing a forced increase in supercharging by actuating the auxiliary chamber in the case where there is an increase in the mass of fuel supplied to the engine per cycle (representing the torque required from the engine), the system operating only when necessary and only to the necessary extent, thus completely escaping from the past dilemma of either choosing a minimum value for the supercharging pressure and thus giving up part of the operating region permitted by the invention (region III in FIG. 1) or of choosing a high minimum value, resulting in excessive consumption by the auxiliary chamber and a considerable decrease in efficiency.

We claim:

1. A supercharging system for a power unit of the type comprising an internal combustion engine having combustion chamber means of the expansible chamber type, a turbine-compressor unit for supercharging the engine and having at least one compressor and at least one turbine receiving the exhaust gases from the engine and driving the compressor, a bypass pipe through which all the air from the compressor which is not absorbed by the engine flows toward the turbine, an auxiliary combustion chamber disposed upstream of the turbine and receiving the air flowing in the bypass pipe and a fuel control system for supplying fuel to the auxiliary combustion chamber, said system comprising engine throttle means for varying the fuel supplied to said engine so as to vary the quantity of fuel injected into the combustion chamber means of said engine to thereby vary the torque developed by said engine as desired within the operating limits of said engine, and regulating means for operating said fuel control system to supply just enough fuel to the auxiliary combustion chamber such that the energy derived by the turbine from the auxiliary combustion chamber plus the energy derived by the turbine from the engine exhaust gases operates said turbine-compressor unit at an output flow rate just sufficient to prevent the ratio of fuel-to-air delivered to said engine combustion chamber means from exceeding a predetermined acceptable value, said engine throttle means comprising a fuel injection system of the positive metering type having a movable mechanical control element operable through a range of positions to vary the quantity of fuel injected per cycle into the engine combustion chamber means, and wherein said regulating means includes means sensing the engine supercharging pressure produced by said compressor and operable to correlate the value of the engine supercharging pressure thus derived with the position of said mechanical control element such that the supercharging pressure is maintained at a set value sufficient to insure that said fuel-to-air ratio does not exceed said predetermined acceptable value.

2. The system according to claim 1 wherein the supercharging pressure set value for each quantity of fuel injected per cycle is correlated with the thermal load on the engine so as to be substantially equal to the maximum permissible thermal load.

3. The system according to claim 2 wherein the maximum permissible thermal load is determined by the maximum permissible engine exhaust temperature.

4. The system according to claim 2 wherein said regulating means includes control means having a movable wall, one surface of which is subjected to the supercharging pressure acting in a direction tending to reduce the flow rate of fuel injected into the auxiliary combustion chamber, the opposite surface being subjected to a pneumatic back-pressure which increases with the quantity of fuel injected per cycle into the enging and with the supercharging pressure.

5. The system according to claim 2 wherein said regulating means includes control means having a movable wall, one surface of which is subjected to a constant pressure acting in one direction and tending to reduce the flow rate of fuel injected into the auxiliary combustion chamber, the opposite surface being subjected to a pneumatic back-pressure which increases with the quantity of fuel injected per cycle into the engine and which decreases with the supercharging pressure.

6. The system according to claim 4 wherein the back-pressure is taken from a duct supplied from a point in the circuit connecting said compressor via a calibrated passage to said turbine and connected to atmosphere via an orifice provided with cross section adjusting means, the position of which is controlled by said mechanical control element.

7. The system according to claim 6 comprising an air cooler disposed between said compressor and said engine, said duct being supplied from a point in the circuit downstream of said cooler.

8. The system according to claim 1 wherein said regulating means comprises an electrically controlled regulating means and a servo-circuit sensitive to the difference between the electric signals supplied by two pickups, one of which is sensitive to the quantity of fuel injected per cycle into the engine and the other of which is sensitive to the engine supercharging pressure.

9. A power unit comprising an internal combustion engine having combustion chamber means, fuel injection means for injecting a metered quantity of fuel per cycle into said combustion chamber means, a turbine-compressor unit for supercharging said engine and having at least one compressor and at least one turbine driving said compressor and receiving the exhaust gases from said combustion chamber means, a bypass pipe through which all the air from said compressor which is not absorbed by said engine flows towards said turbine, an auxiliary combustion chamber disposed upstream of said turbine and receiving the air flowing in said bypass pipe, and a fuel control system for supplying fuel to said auxiliary combustion chamber, comprising means for metering the flow rate of fuel supplied to said auxiliary chamber so as to prevent the supercharging pressure falling below a set value, sensing means operatively associated with said fuel injection means so as to be sensitive to the quantity of fuel injected per cycle into said combustion chamber means by said fuel injection means and means controlled by said sensing means operative to adjust said set value of the supercharging pressure as a function of said quantity of fuel such that said fuel control system causes said auxiliary combustion chamber to supply energy to said turbine-compressor unit as needed to augment the energy supplied thereto by the exhaust gases whereby said unit maintains the air-to-fuel ratio in said engine combustion chamber means above a predetermined minimum value.

10. A power unit according to claim 9, wherein means controlled by said sensing means is operable to adjust the set value for each quantity of fuel injected per cycle such that the thermal load on the engine is substantially equal to the maximum permissible thermal load.

11. A power unit according to claim 10, wherein the maximum permissible thermal load is determined by the engine exhaust temperature.

12. A power unit according to claim 10, wherein said fuel injection means are of a type which, at each cycle, supply a quantity of fuel in accordance with the position of a movable mechanical control element, said sensing means being operatively coupled with said mechanical control element to track the movement thereof.

13. A power unit according to claim 9, wherein the means for metering the flow rate of fuel supplied to the auxiliary combustion chamber comprises throttle means through which at least part of the fuel delivered by a compressed-fuel source travels, the throttle means being connected to control means, the position of which depends on the supercharging pressure and on the quantity of fuel injected per cycle into the engine.

14. A power unit according to claim 13, wherein the throttle means is connected to movable wall means, one surface of which is subjected to the supercharging pressure acting in a direction tending to reduce the flow rate of fuel injected into the auxiliary combustion chamber, the opposite surface being subjected to a pneumatic back-pressure which increases with the quantity of fuel injected per cycle into the engine and with the supercharging pressure.

15. A power unit according to claim 13, wherein the throttle means is connected to movable wall means, one surface of which is subjected to a constant pressure acting in one direction and tending to reduce the flow rate injected into the auxiliary chamber, the opposite surface being subjected to a pneumatic back-pressure which increases with the quantity of fuel injected per cycle into the engine and which decreases with the supercharging pressure.

16. A power unit according to claim 14, wherein the back-pressure is taken from a duct supplied from a point in the circuit connecting the compressor via a calibrated passage to the turbine and connected to atmosphere via an orifice provided with cross-section adjusting means, the position of which is controlled by the means for regulating the flow rate injected during each cycle into the engine.

17. A power unit according to claim 16, comprising an air cooler disposed between the compressor and the engine, the said duct being supplied from a point in the circuit downstream of the cooler.

18. A power unit according to claim 12, wherein the sensing means comprises a transducer which produces a pressure drop, depending on the position of the mechanical means, in a fluid flowing through it.

19. A power unit according to claim 1, wherein the means for adjusting the flow rate of fuel supplied to the chamber comprise an electrically controlled regulating means and a servo circuit sensitive to the difference between the electric signals supplied by two pick-ups, one of which is sensitive to the quantity of fuel injected per cycle into the engine and the other of which is sensitive to the engine supercharging pressure.

20. A supercharging system for a power unit of the type comprising an internal combustion engine having combustion chamber means of the expansible chamber type, a turbine-compressor unit for supercharging the engine and having at least one compressor and at least one turbine receiving the exhaust gases from the engine and driving the compressor; a bypass pipe through which all the air from the compressor which is not absorbed by the engine flows toward the turbine, an auxiliary combustion chamber disposed upstream of the turbine and receiving the air flowing in the bypass pipe and a fuel control system for supplying fuel to the auxiliary combustion chamber, said system comprising engine throttle means for varying the fuel supplied to said engine so as to vary the quantity of fuel supplied the combustion chamber means of said engine to thereby vary the torque developed by said engine as desired within the operating limits of said engine, and regulating means for automatically operating said fuel control system including sensing means responsive to at least one engine operating parameter correlated to the quantity of fuel supplied to said engine combustion chamber per cycle, said sensing means being operably coupled to said fuel control system to supply just enough fuel to the auxiliary combustion chamber such that the energy derived by the turbine from the auxiliary combustion chamber plus the energy derived by the turbine from the engine exhaust gases operates said turbine-compressor unit at an output flow rate just sufficient to supply enough mass of air to said combustion chamber per cycle to prevent the ratio of fuel-to-air delivered to said engine combustion chamber means from exceeding a predetermined acceptable value correlated with the maximum permissable thermal load for said engine to thereby prevent overheating of the engine.

* * * * *

UNITED STATES PATENT AND TRADEMARK OFFICE
CERTIFICATE OF CORRECTION

PATENT NO. : 4,114,379
DATED : September 19, 1978
INVENTOR(S) : Jean Melchior and Thierry Andre It is certified that error appears in the above-identified patent and that said Letters Patent are hereby corrected as shown below:

In the Claims

Claim 19, column 12, line 14, cancel the numeral "1" and insert -- 9 --

Signed and Sealed this

Ninth Day of January 1979

[SEAL]

Attest:

RUTH C. MASON
Attesting Officer

DONALD W. BANNER
Commissioner of Patents and Trademarks